Sept. 17, 1935.　　　　F. W. WAPPAT　　　　2,014,541

PRESSURE REGULATING VALVE

Filed Sept. 15, 1934　　　2 Sheets-Sheet 1

INVENTOR.
FRED W. WAPPAT
BY James C. Bradley
ATTORNEYS.

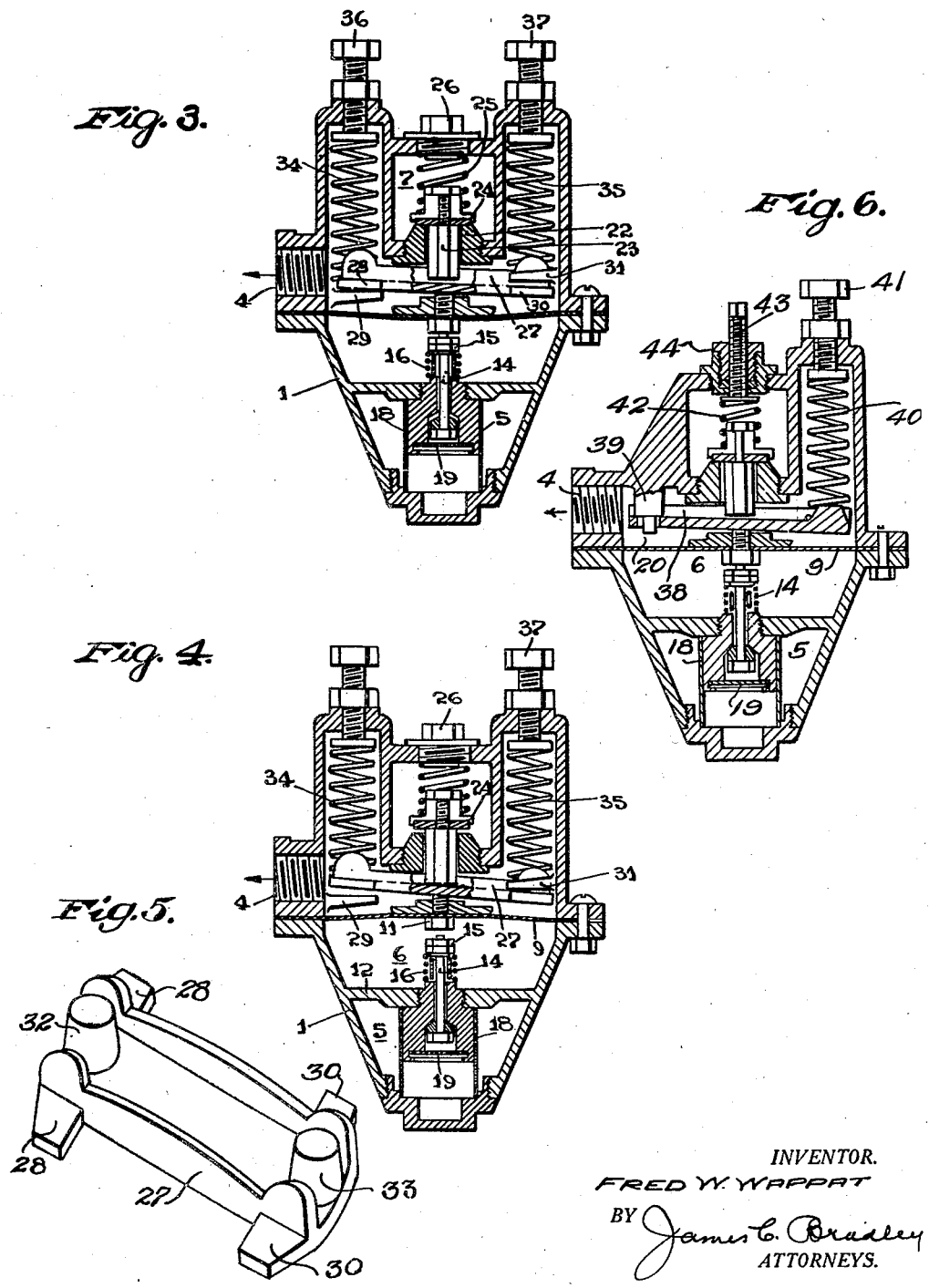

Patented Sept. 17, 1935

2,014,541

UNITED STATES PATENT OFFICE 2,014,541

PRESSURE REGULATING VALVE

Fred W. Wappat, Pittsburgh, Pa.

Application September 15, 1934, Serial No. 744,178

7 Claims. (Cl. 277—20)

Figure 1:
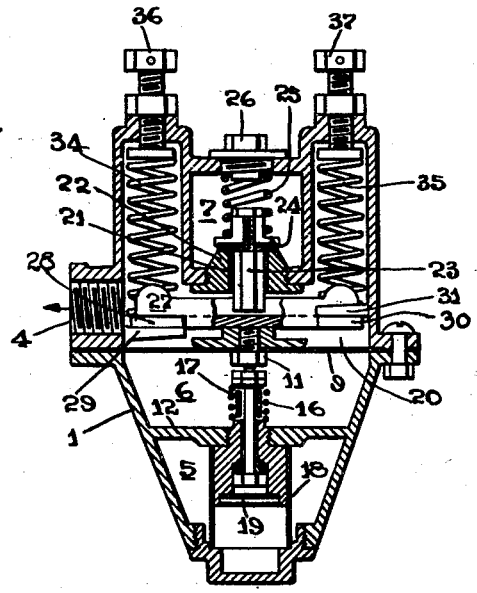
Figure 2:
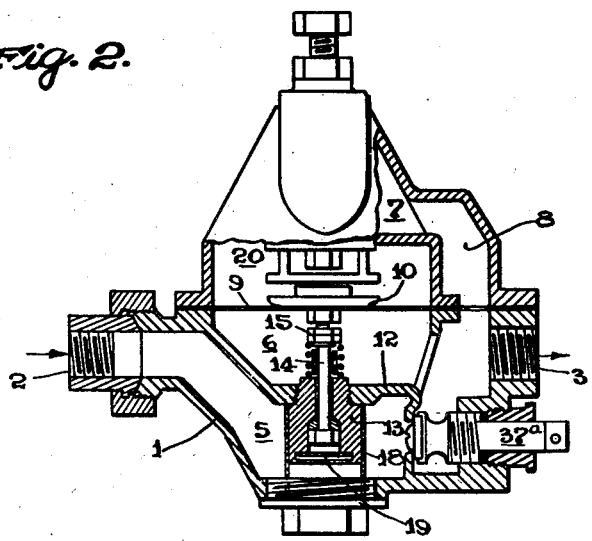

The invention relates to pressure regulating valves, and is designed particularly for use in connection with hot water heating systems, in which it is necessary to control the pressure supplied from the main to the boiler, and also the pressure generated in the system due to the heating of the water. To this end the valve casing is provided with two valves, one an inlet valve which closes when the pressure supplied from the main reaches a predetermined point, and the other a relief valve which opens and allows some of the water to escape from the system when the pressure in the system rises above a predetermined point. One object of the present invention is the provision of improved means for operating both valves from a single diaphragm, which is reliable in operation and which gives a pressure regulation within relatively narrow limits, thus insuring safety and economy in operation. A further object is the provision of a construction which can be made at a lower cost than devices heretofore made for performing the same functions, and which is not liable to get out of order. Still another object is the provision of means for operating the pressure relief valve which insures against such valve sticking against its seat and thus refusing to open until the pressure in the system rises above the point at which the valve is intended to open. Certain embodiments of the invention are illustrated in the accompanying drawings, wherein:

Figs. 1 and 2 are sections through the preferred construction taken in vertical planes at right angles to each other with the parts in the positions occupied when the pressure in the system is normal. Fig. 3 is a section similar to that of Fig. 1, but with the parts in the positions occupied when the pressure in the system is below normal and water is being supplied past the inlet valve to the system from the main. Fig. 4 is also a section similar to that of Fig. 1, but with the parts in the positions occupied when the pressure in the system is above normal and water is being allowed to escape past the pressure relief valve. Fig. 5 is a detail perspective view on an enlarged scale of the floating lever which controls the movement of both of the valves. And Fig. 6 is a view similar to that of Fig. 1 through a modification which is simpler and cheaper than the construction of Figs. 1 to 5, but not so desirable in other particulars.

Referring to the drawings, 1 is the casing having an inlet 2 to be connected to a water supply main, an outlet 3 adapted to be connected to the boiler of a hot water heater, and a pressure relief outlet 4 (Fig. 1) adapted to be connected to the sewer. The inlet 2 leads into an inlet chamber or space 5, above which is the pressure chamber formed of two cavities 6 and 7 connected by the passage 8 (Fig. 2). Clamped between the upper and lower sections of the casing is a metal diaphragm 9 which constitutes the upper wall of the pressure cavity 6, and which serves to actuate the inlet valve and the pressure relief valve later described. This diaphragm has the disc 10 clamped to its central portion by means of the bolt 11.

Intermediate the chambers 5 and 6 is a wall 12 carrying the valve block 13, in which is mounted the inlet valve 14 consisting of a stem having a valve disc at its lower end and the nuts 15 threaded on its upper end. This valve is yieldingly closed by the spring 16, and inside this spring is a perforated sleeve 17 which merely acts as a stop to limit the opening movement of the valve. Screening means for the water flowing from the chamber 5 to the chamber 6 is provided in the form of the cylindrical screen 18 which fits around the valve block and the flat screen 19 which fits into a recess in the block just below the valve disc.

Lying just above the diaphragm 9, is a third chamber 20 which has the relief outlet 4, and which may be designated as the pressure relief chamber. This chamber 20 is connected to the section 7 of the pressure chamber by means of the passage 21 in the plug 22, in which is fitted loosely the fluted stem 23 which carries the relief valve disc 24. This valve is yieldingly held closed by the spring 25, a removable plug 26 being provided in the casing above the spring and valve to give convenient access thereto.

Lying above the diaphragm between the two valves is the floating lever 27 shown in perspective in Fig. 5. This lever has at one end a pair of laterally projecting lugs 28 which lie above a pair of lugs 29 (Fig. 1) integral with the casing. At its other end it has a similar pair of lugs 30 which lie below a pair of lugs 31, also integral with the casing. Seated over the lugs 32 and 33 of the lever are the coil springs 34 and 35 whose tension may be adjusted by means of the screws 36 and 37.

When the device is installed, but before pressure from the main is supplied through the inlet 2, or when this pressure is below a predetermined point such as, for example, 12 pounds, the parts occupy the position shown in Fig. 3, the inlet valve 14 being open and the relief valve 24 being closed. The lever is held in the position shown by the pressure of the springs 34 and 35 which forces the diaphragm down, so that it holds the inlet valve 14 open against the pressure of its spring 16.

If now the pressure supplied to the pressure chamber 6, 7 past the valve 14 rises above the 12 pound limit, for which the device is set, such pressure forces the diaphragm upward moving the parts to the position shown in Figs. 1 and 2, permitting the spring 16 to close the inlet valve 14, so that there is no further increase in pressure in the chamber 6, 7 and the heating system to which it is connected. During this movement of the diaphragm, the lever 27 fulcrums about its left hand end which is supported against upward movement by the spring 34. The right hand end of the lever is thus swung upward by the pressure applied to the central portion thereof by the diaphragm until it engages the stop lugs 31 which prevent any further movement. At this time, the relief valve 24 still remains closed, as the lever 27 has not been raised high enough to engage the end of the stem 23. If the pressure in the system drops below the 12 pound limit for which it is set, due to evaporation or leakage, the spring 35 will move the lever and diaphragm down to again open the valve 14, so that more pressure is admitted to bring the pressure up to normal when the valve will again be closed.

The relief valve 24 comes into play when the pressure in the system rises above the safety point, which for example may be 29 pounds. When the pressure reaches this point, due to the heat supplied to the system or to any cause, a further upward movement of the diaphragm brings the parts to the position illustrated in Fig. 4, thus opening the relief valve 24 and permitting an escape of fluid from the pressure chamber 6, 7 to the relief chamber 20 and out through the outlet 4 to the sewer. During this upward movement of the diaphragm, the lever 27 fulcrums at its right hand end on the lugs 31, the other end being swung up, as shown, compressing the spring 34. As soon as the pressure in the system drops slightly below the 29 pound point, the diaphragm moves down and the lever swings back to the position of Figs. 1 and 2 permitting the spring 25 to close the relief valve.

Any tendency of the relief valve disc 24 to stick on its seat and reduce its sensitiveness in opening, is avoided, due to the fact that the lever 27 is slightly inclined with respect to the plane of the valve seat when the lever engages the stem, so that such engagement tends to tilt the stem and the disc, this being permitted by the loose fit of the stem in the passage 22. The force required to unseat the disc is considerably less under these conditions. The by-pass valve 37a shown in Fig. 2 is to provide for a more rapid filling of the boiler and system than can be secured past the inlet valve 14. In normal operation this valve is in the closed position shown. This is a detail of construction well known in the art. The adjustment of the screws 36 and 37 permits of the independent regulation of the pressures at which the valves 14 and 24 open, the spring 35 serving to govern the pressure at which the admission valve 14 opens, while the spring 34 governs the pressure at which the relief valve 24 opens.

Fig. 6 illustrates a modification of the invention which follows the construction of Figs. 1 to 5 except as to the lever construction and in the omission of the spring 34, the arrangement of the cavities, inlets and outlets and valves being the same, and the parts being similarly numbered. The lever 38 is, in this case, pivoted on the post 39 and is yieldingly pressed down by the spring 40, whose pressure may be adjusted by the screw 41, thus regulating the pressure at which the inlet valve 14 opens and closes. The valve disc 24 is, in this case, held down by a relatively stiff spring 42 which may be adjusted by the screw 43 extending through the removable gland 44. It is the tension of this spring combined with that of the spring 40 which governs the pressure at which the valve 24 opens to reduce the pressure in the system by permitting a flow of water to the chamber 20 and out through the relief outlet 4. The parts are shown in normal operating position with the pressure in the system and in the chamber 6 within the 12 to 29 pound limit selected as an example. When the pressure drops below the 12 pound limit, the spring 40 forces the lever 38 and diaphragm down opening the inlet valve to admit water from the main thus bringing the pressure in the system up to the 12 pound point, at which time the pressure of the water in the chamber 6 moves the diaphragm up permitting the inlet valve to close. When the pressure in the system rises above the 29 pound point, the diaphragm is moved upward above the position shown moving the lever 38 upward to engage the stem of the relief valve 24 and opening the valve against the pressure of the spring 42. This permits the escape of fluid past the valve to the relief chamber and outlet 4, thus reducing the pressure a few pounds below the 29 pound limit when the diaphragm and lever move down and the valve closes.

The term "chamber" is used herein in its broad sense, any cavity or passage in the casing being regarded as a chamber.

What I claim is:

1. In combination in a pressure regulating device, a casing provided with a diaphragm, a relief chamber on one side thereof having an outlet, a pressure chamber having an outlet and comprising two cavities, one of which lies on the same side of the diaphragm as the relief chamber back of such chamber and the other of which lies on the other side of the diaphragm, an inlet chamber back of the last mentioned cavity of the pressure chamber and provided with an inlet, a passage between the relief chamber and the cavity of the pressure chamber which lies back of such relief chamber, a second passage lying between the other cavity of the pressure chamber and the inlet chamber, a self closing valve for each of said passages, said diaphragm being exposed to the pressure in the pressure chamber normally holding the valve between the inlet and pressure chambers in open position and arranged, when moved by the pressure in the pressure chamber, to first permit the closure of the last mentioned valve, and then on a further movement in the same direction to open the other valve, and a pair of springs opposing said movement of the diaphragm, one of which springs governs the pressure at which the open valve closes and the other of which governs the pressure at which the other valve opens.

2. In combination in a pressure regulating device, a casing comprising an inlet chamber provided with an inlet, a pressure chamber provided with an outlet, and a relief chamber provided with an outlet, with connecting passages between the inlet and pressure chambers and the pressure and relief chambers, a self-closing valve for each passage, a diaphragm exposed to the pressure in the pressure chamber lying between the valves and normally holding the valve in the passage between the inlet chamber and the pressure chamber in open position, said diaphragm being arranged when moved by the pressure in the pressure chamber to first permit the closure of the last mentioned valve and then on a further movement in the same direction to open the other valve, a lever lying between the diaphragm and said other valve, and a pair of independently adjustable springs opposing the movement of the lever, one of which governs the pressure at which the open valve closes and the other of which governs the pressure at which the other valve opens.

3. In combination in a pressure regulating device, a casing comprising an inlet chamber provided with an inlet, a pressure chamber provided with an outlet, and a relief chamber provided with an outlet, with connecting passages between the inlet and pressure chambers and the pressure and relief chambers, a self-closing valve for each passage, a lever lying between the valves, spring pressed in a direction to oppose the closing of the inlet valve in the passage between the inlet and pressure chambers and the opening of the other (relief) valve by a pair of springs one of which governs the pressure at which the inlet valve closes, and the other of which governs the pressure at which the relief valve opens, and a diaphragm exposed to the pressure in the pressure chamber and lying between the lever and the inlet valve normally held by the lever so that it maintains the inlet valve in open position, the parts being so arranged that when the diaphragm is moved by pressure in the pressure chamber it first permits the inlet valve to close and then on a further movement causes the lever to open the relief valve.

4. In combination in a pressure regulating device, a casing including a pressure chamber having an outlet, an inlet, and a relief outlet with the inlet and relief outlet in opposition to each other, valves in said inlet and in the relief outlet which close by movement toward each other, yielding means tending to close each valve, a diaphragm interposed between the valves adapted when acted upon by pressure in the pressure chamber to permit the closing of the inlet valve and to cause the opening of the relief valve, a floating lever between the diaphragm and the relief valve, and a pair of springs arranged to exert pressure on the ends of the lever tending to move the diaphragm to position to permit the relief valve to close and to open the inlet valve, one of which governs the pressure at which the inlet valve closes and the other of which governs the pressure at which the relief valve opens.

5. In combination in a pressure regulating device, a casing including a pressure chamber having an outlet, an inlet, and a relief outlet with the inlet and relief outlet in opposition to each other, valves in said inlet and in the relief outlet which close by a movement toward each other, yielding means tending to close each valve, a diaphragm interposed between the valves adapted when acted upon by pressure in the pressure chamber to permit the closing of the inlet valve and to cause the opening of the relief valve, a floating lever between the diaphragm and the relief valve, a pair of springs, one at each end of the lever, arranged to exert pressure thereon to move the diaphragm to position to permit the relief valve to close and to open the inlet valve, and means for adjusting the pressure exerted by each spring.

6. In combination in a pressure regulating device, a casing including a pressure chamber having an outlet, an inlet, and a relief outlet with the inlet and relief outlet in opposition to each other, valves in said inlet and in the relief outlet which close by a movement toward each other, yielding means tending to close each valve, a diaphragm interposed between the valves adapted when acted upon by pressure in the pressure chamber to permit the closing of the inlet valve and to cause the opening of the relief valve, a floating lever between the diaphragm and the relief valve, a pair of springs, one at each end of the lever, arranged to exert pressure thereon to move the diaphragm to position to permit the relief valve to close and to open the inlet valve, stop means for limiting the movement of one end of the lever in the valve opening movement of the diaphragm, and other stop means for limiting the movement of the other end of the lever when the diaphragm moves in the reverse direction.

7. In combination in a pressure regulating device, a casing comprising an inlet chamber provided with an inlet, a pressure chamber provided with an outlet, and a relief chamber provided with an outlet, with connecting passages between the inlet and pressure chambers and the pressure and relief chambers, a self closing valve for each passage, a floating lever lying between the valves, spring pressed by two independently adjustable springs in a direction to oppose the closing of the inlet valve in the passage between the inlet and pressure chambers and the opening of the other (relief) valve, one of said springs governing the pressure at which the inlet valve closes, and the other governing the pressure at which the relief valve opens, and a diaphragm exposed to the pressure in the pressure chamber and lying between the lever and the inlet valve normally held by the lever so that it maintains the inlet valve in open position, the parts being so arranged that when the diaphragm is moved by pressure in the pressure chamber it first permits the inlet valve to close and then on a further movement causes the lever to open the relief valve, said relief valve comprising a disc having a stem fitting loosely in the relief passage arranged so that the end of the stem is engaged by said lever when such lever lies at an inclination with respect to the seating face of the disc.

FRED W. WAPPAT.